Figure 1:
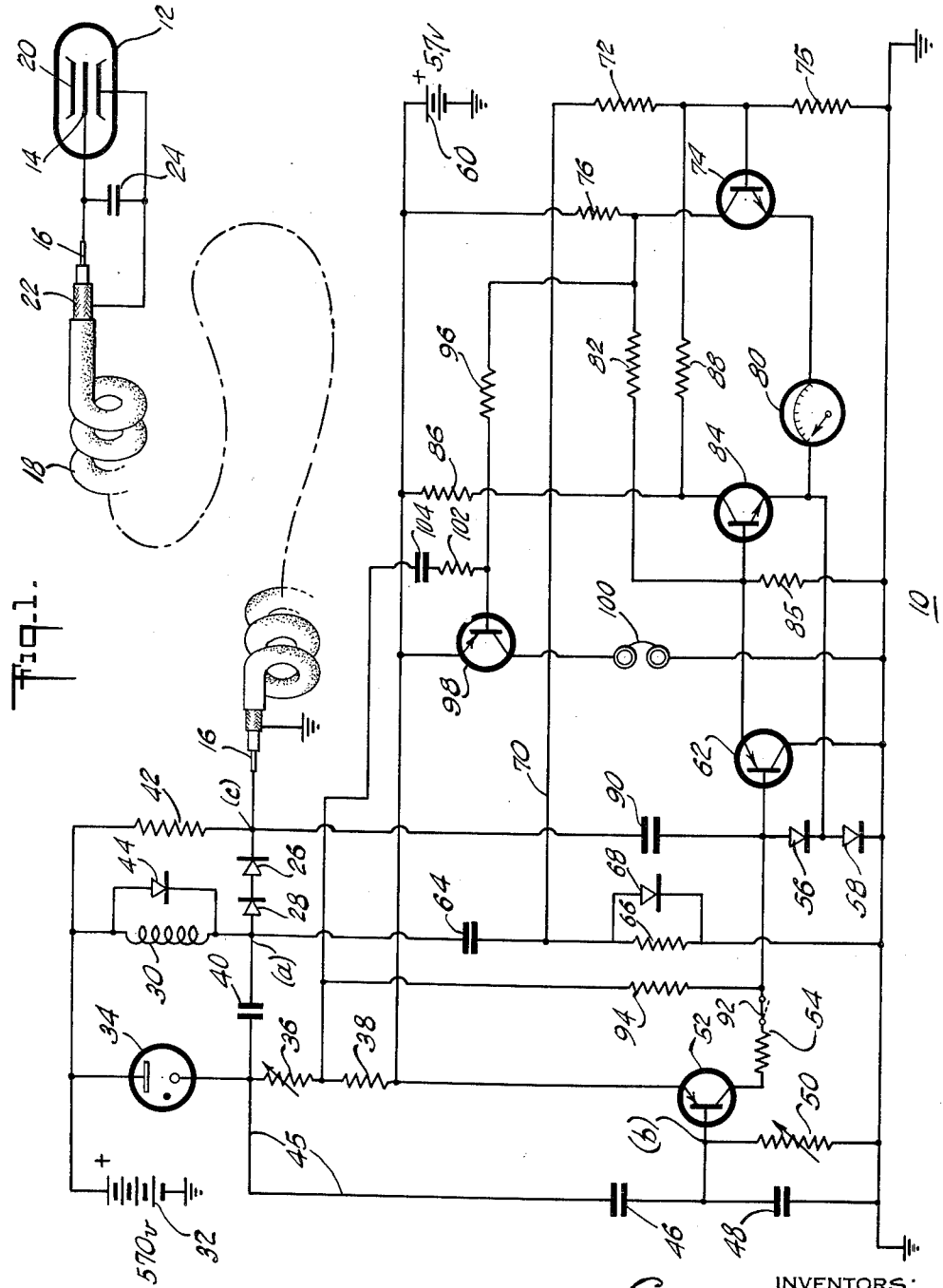

Nov. 20, 1962

G. J. ACHTELLIK ET AL 3,065,349

RADIATION METER

Filed Nov. 18, 1959

2 Sheets-Sheet 1

INVENTORS:
GERARD J. ACHTELLIK
JAMES M. CONSTABLE
BY
Curtis, Morris & Safford.
ATTORNEYS:

INVENTORS:
GERARD J. ACHTELLIK
JAMES M. CONSTABLE
BY
Curtis, Morris & Safford
ATTORNEYS

# United States Patent Office 3,065,349
Patented Nov. 20, 1962

3,065,349
RADIATION METER
Gerald J. Achtellik, North Greenwich, Conn., and James M. Constable, White Plains, N.Y., assignors to Electronic Products Company, Mount Vernon, N.Y.
Filed Nov. 18, 1959, Ser. No. 853,828
15 Claims. (Cl. 250—83.6)

This invention relates to a device for measuring penetrating radiation and, more particularly, it relates to a portable device for measuring such radiation.

An object of this invention is to provide a wide range radiation measuring instrument which can measure low to high intensity radiation with substantially improved accuracy.

A more specific object is to provide such an instrument which is small enough and light enough to be truly portable and which can operate efficiently for long periods of time on self-contained flashlight batteries.

Another object is to provide in an instrument of this kind a relatively simple and inexpensive electrical circuit using a Geiger-Müller tube and having greatly improved operating efficiency, stability, and accuracy.

These and other objects will in part be pointed out in and in part understood from the following description.

A Geiger-Müller (G-M) tube is a convenient device for measuring radiation because it is relatively inexpensive, and because it is small, rugged and reliable. It is therefore widely used in radiation measuring instruments. However, it has several shortcomings which for some applications vitiate its many advantages. Among these shortcomings is the fact that above a certain radiation level a G-M tube will block, i.e. it will conduct continuously so that the output signal from it is no longer a series of discrete pulses whose rate of occurrence is proportional to radiation intensity. When blocking is present it is very difficult to get a useful measure of the radiation impinging on the G-M tube.

Another shortcoming with a G-M tube is that the output signal from it is in the form of low current pulses at high impedance. This makes it difficult, most especially in a portable instrument where size and power drain must be kept to absolute minimums, to convert the tube signals into a visible quantitative measurement, such as a reading on a relatively low-resistance micro-ammeter. The present invention provides an electrical circuit using a G-M tube which overcomes these shortcomings while retaining the many advantages of such a tube.

In accordance with the present invention there is provided a G-M tube radiation measuring circuit wherein the tube is periodically pulsed "on" by energizing pulses which may for example have a generally saw-tooth waveform rather than a sharp-cornered rectangular shape. Then during a short interval, determined by small amplitude square-cornered gating pulses occurring for short instants at the beginning of the energizing pulses, the signal pulses, if any, from the tube are compared with regularly occurring momentary pulses synchronized with the energizing pulses. If there is coincidence between a signal and an energizing pulse, the circuit is arranged to switch on current to a microammeter, but is arranged to switch off the current if there is no coincidence. The current controlled by the circuit comes from a low resistance source, such as a battery, and since this current is in the form of long duration, low impedance pulses, as distinguished from the sharp voltage spikes produced as signal pulses by the G-M tube, there is no problem in coupling to a low-resistance meter. Furthermore, as will be explained more fully later on, by virtue of the pulse coincidence operation, the accuracy and calibration of the meter reading is effectively independent over a wide range of frequency or repetition rate of the energizing pulses applied to the G-M tube. In addition, since the microammeter is not energized directly by the pulses from the G-M tube, the meter reading is not noticeably affected by variations over a wide range in the amplitudes of these pulses. Because of this, normal differences or variations in the characteristics of mass-produced G-M tubes are easily permitted in this circuit and very expensive, specially produced G-M tubes are not required. For the operator's safety, this circuit is arranged to give an audible as well as visual indication when exposed to high intensity radiation.

This instrument can be switched from high range to low range simply by omitting the gating pulses and operating the circuit so that whenever signal pulses are emitted by the G-M tube, current will be switched on to the meter. Accurate full-scale meter readings as low as 0.5 milli-roentgen per hour are easily obtained. To make the scale form factor on the low range correspond to the high intensity range, the repetition rate of the energizing pulses on the low range is adjusted. This, since now the meter reading is dependent on this repetition rate, will adjust the reading to the desired proportional amplitude.

Figure 2:
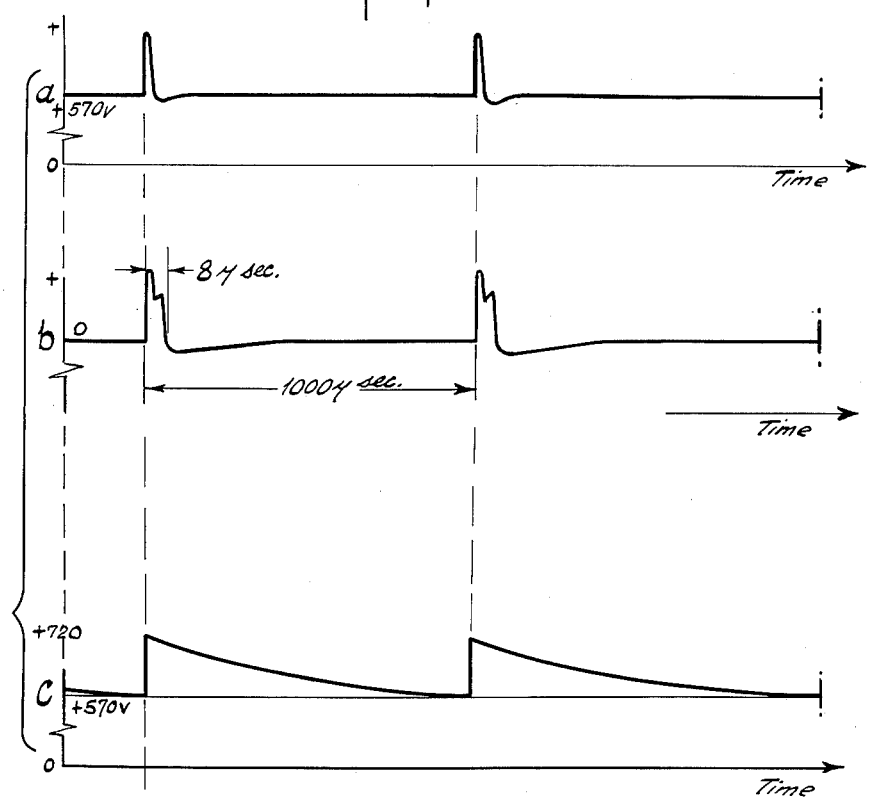
Figure 3:
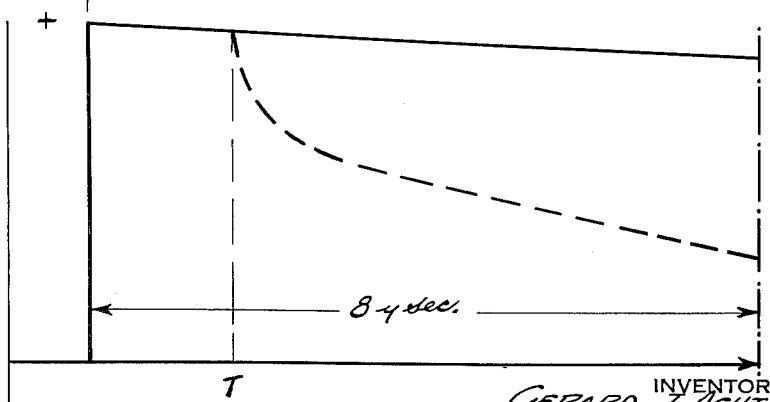

A better understanding of the invention together with a fuller appreciation of its many advantages will best be gained from the following description given in connection with the accompanying drawings in which:

FIGURE 1 is a schematic diagram of a circuit embodying features of the invention;

FIGURES 2(a), (b) and (c) show the time relationships of electrical pulses occurring at the points in the circuit indicated by numerals (a), (b) and (c) respectively; and FIGURE 3 is a greatly expanded portion of a pulse in FIGURE 2(c).

The circuit 10 shown in FIGURE 1 includes a G-M tube 12 which is adapted to be exposed to penetrating radiation. The anode 14 of this tube is connected to the center conductor 16 of a lengthy co-axial cable 18, the cathode 20 of tube 12 being connected to the outer conductive shielding 22 of the cable. This cable may be coiled as shown so that it can be extended as a probe with tube 12 at its right or outer end and the remainder of the circuit a considerable distance away at the left end. The inter-conductor capacitance of this cable and the inter-electrode capacitance of tube 12 are indicated by a lumped capacitor 24 shunting the anode and cathode of the tube. The left end of shielding 22 is grounded to a casing (not shown) enclosing circuit 10. The left end of conductor 16 is direct-current connected through a diode 26, having quick recovery time, and a diode 28, having high back resistance, to one side of an inductor 30. The other side of the inductor is connected to the positive side of a high voltage battery supply 32 (e.g. 570 v.) whose negative side is grounded. Thus the anode of G-M tube 12 is continuously energized with the positive voltage supplied by battery 32. However, this battery voltage is somewhat below the operating potential of the G-M tube (e.g. 600 v.) and so, as will be explained, additional positive voltage is applied to conductor 16 to enable the tube to conduct.

Connected to the positive side of battery 32 is a cold cathode gas diode 34 which in conjunction with resistors 36 and 38 and a capacitor 40 comprises a relaxation oscillator. Gas diode 34 periodically breaks down and conducts and in so doing applies positive pulses of several hundred volts amplitude, as illustrated in FIGURE 2(a), to the left end of diode 28. These pulses add to the steady direct voltage at this point to drive the anode voltage of G-M tube 12 well above its starting value (e.g. to 720 v.). The resultant waveform at anode 14 is illustrated in FIGURE 2(c), the duration of each anode pulse being generally longer than the corresponding energizing pulse in FIGURE 2(a) because of capacitor 24, and the de-coupling action of diodes 26 and 28. To insure the periodic discharge of this capacitor, conductor 16 is connected by a high value resistor 42 to battery 32. Somewhat before the next pulse occurs, a given anode pulse will discharge to below the starting voltage of G-M tube 12 thereby insuring that it is positively extinguished. Inductor 30 is shunted with a diode 44 to prevent ringing. This inductor limits the rise time and the length of the energizing pulses.

Positive pulses at the cathode of gas diode 34 are applied through a lead 45 to a voltage divider comprising the capacitors 46 and 48. Connected to the junction of these capacitors is a resistor 50 shunting the base of a gating transistor 52 to ground. This transistor is normally conducting with its collector connected through a resistor 54, a clamping diode 56 and a diode 58 to ground, and with its emitter energized from the positive side of a low-voltage battery 60 (e.g. 5.7 v.). The right end of resistor 54 is also connected to the base of an amplifying transistor 62 and when a short, sharp positive gating pulse as indicated in FIGURE 2(b) is applied to the base of transistor 52, it is turned off for the duration of the pulse. This in turn permits transistor 62 to turn on, it being actually turned on only when a signal pulse is obtained from G-M tube 12.

The energizing pulses at the junction of capacitor 40 and diode 28 are also applied to a small capacitor 64 whose other side is grounded through a resistor 66 and a diode 68 in parallel. Thus the rising edge of each energizing pulse immediately charges capacitor 64 and the falling edge of the pulse causes the junction of the capacitor and resistor 66 to follow negative. Thus a sharp negative timing pulse is applied through a lead 70 and a resistor 72 to the base of a transistor 74. For a microsecond or so after the beginning of each energizing pulse at (a), transistor 74 is positively held off. This prevents false operation of the circuit because of switching transients at various points. If a signal pulse is thereafter received from G-M tube 12 during the brief "gate" period that transistor 62 is able to turn on, then transistor 74 will be turned on, as will be explained in detail shortly. A "gate" period may for example be 8 microseconds and the interval between them about 1000 microseconds corresponding to the pulse repetition rate of the energizing pulses. After being turned on, transistor 74 will remain on until the next energizing pulse at which the transistor will automatically be turned off by a negative timing pulse, as just explained. If no signal pulse is received from G-M tube 12, then even though transistor 74 is freed to turn on as soon as the sharp negative timing pulse on lead 70 disappears, it will not do so. This "off" state continues until the next energizing pulse at which a signal pulse is received during the brief "gate" interval that transistor 62 is free to turn on.

The base of transistor 74 is grounded through a resistor 75 and its collector is connected through a load resistor 76 to battery 60. The emitter of the transistor is connected through a low resistance microammeter 80 to diode 58. The latter, in effect, serves as a half volt bias battery. Thus whenever transistor 74 is on, current from battery 60 flows through meter 80. The statistical average of the "on" times of transistor 74 is a proportional measure of the intensity of the radiation impinging on G-M tube 12. For a given range, which range is determined by the duration of the gating pulses applied to transistor 62, the higher the intensity of radiation, the more often transistor 74 will be on and the greater the meter reading. This statistical "coincidence" operation is described in more detail in connection with a somewhat different circuit in co-pending application Serial No. 691,663, filed October 22, 1957. An important advantage of this operation is that for a given intensity of radiation and with a given gating pulse duration, the meter reading is effectively independent of the repetition rate of the energizing pulses over a wide range. Also the meter reading is not appreciably affected by the amplitude of the signal pulses from G-M tube 12.

Whenever transistor 74 is turned off, a positive pulse at its collector is applied through a resistor 82 to the base of a transistor 84, the base being connected to ground through a resistor 85. The collector of transistor 84 is connected through a resistor 86 to battery 60 and its emitter is connected to diode 58. The positive pulse from transistor 74 when it turns off, turns transistor 84 on. When the latter is on, the voltage at its collector is less than when the transistor is off. This decreased collector voltage is therefore applied through a resistor 88 to the base of transistor 74 and keeps it off until transistor 84 is turned off by a negative pulse from transistor 62. When transistor 84 is turned off, transistor 74 is turned on and remains on until turned off by a negative timing pulse on lead 70 at the next energizing pulse. Transistors 74 and 84 comprise a bi-stable flop-flop switch for turning the current to meter 80 on or off under the conditions stated.

Transistor 62 is able to turn on and turn transistor 84 off only when gate transistor 52 is off and only when transistor 74 is permitted to turn on by the absence of a negative timing pulse on lead 70. Whether transistor 62 does in fact turn on depends on whether a signal is received from G-M tube 12.

It will be noted that the connection to G-M tube 12 via cable 18 is "single-ended," in other words, shielding 22 is grounded and only lead 16 is available for receiving a signal from the tube. However, this same lead must be used for applying the high-amplitude energizing pulses to the tube. Ordinarily, therefore, it would be difficult to detect a signal pulse. In the present circuit, however, after the leading edge of an energizing pulse has been applied through diodes 26 and 28 to lead 16, the diodes act to disconnect the elements to their left from this lead. The voltage on the lead then decays exponentially at a rate determined by resistor 42 and capacitor 24. FIGURE 3 shows greatly expanded the initial portion of this voltage on lead 16 corresponding in duration to a gating pulse in FIGURE 2(b). If there is no signal from G-M tube 12, that is, if it does not conduct during this interval, then the voltage will decay along the solid line. However, if there occurs an ionizing incident at time T for example, the tube will conduct and will discharge the capacitor shunting it at a faster rate, as indicated by the dotted line. Now, to detect this signal, conductor 16 is connected through a small capacitor 90 to the base of transistor 62. Normally, this capacitor being loaded with the impedance presented at the base of the transistor is not large enough to cause the transistor to turn on during the relative slow decrease in the voltage on lead 16, as indicated by the solid line in FIGURE 3. However, whenever this voltage decreases at a faster rate, as indicated by the dotted line, then capacitor 90 is effective and transistor 62 will be momentarily turned on. This of course flips transistor 84 off and flops transistor 74 on, in which state they remain until the next energizing pulse and the resulting negative timing pulse on lead 70. This arrangement, in addition to facilitating single-ended operation of G-M tube 12, permits it to be energized with pulses whose duration need not be precisely determined, and which as a consequence are easily generated. The gating pulses on the other hand, being of relatively small amplitude can easily be made to have precise turn-on and turn-off times.

To condition the present circuit for operation at a somewhat lower range (i.e. higher sensitivity of measurement) resistor 50 is increased in value to increase the duration of the gating pulses applied to the base of transistor 52. For an even lower range, transistor 52 can be disconnected from transistor 62 by opening a switch 92 to the dotted line position indicated. Then whenever a signal is received from G-M tube 12 transistor 62 will be enabled to turn transistor 84 off and transistor 74 on.

Under these conditions where transistor 62 is able to turn on at any time and where G-M tube 12 is energized above its starting voltage a major percentage of the time, the reading of meter for a given intensity of radiation is dependent upon the repetition rate of the energizing pulses. Therefore when switch 92 is opened, by also adjusting the value of resistor 36, for example, to decrease the repetition rate of the energizing pulses, the sensitivity of the circuit can be set so that on this low range the calibration of meter 80 is the same as for a higher range except for an integral multiplying or dividing factor. Even though switch 92 is open, direct voltage bias is applied to the base of transistor 62 through a resistor 94.

As a safety precaution for the person operating it, circuit 10 is provided with an audible signal device which operates as follows. Connected to the collector of transistor 74 through a resistor 96 is the base of a transistor 98. The emitter of this transistor is connected to battery 60 and its collector is connected to a set of earphones 100 whose lower side is grounded. When the average voltage at the collector of transistor 74 is sufficiently negative, indicating that transistor 74 is often "on," transistor 98 is turned on and produces an amplified buzzing signal in the earphone corresponding to the repetition frequency of the energizing pulses, a proportional signal being applied to the base of transistor 98 through a resistor 102 and a capacitor 104. Thus even if circuit 10 "blocks," that is, meter 80 becomes unable to respond accurately because of the high intensity of radiation impinging on G-M tube 12, a warning signal will nonetheless be sounded in the earphone.

The above description of the invention is intended as an illustration of its general principles and is not to be understood as restricting the invention to the particular embodiment described and illustrated. Various changes in the circuit illustrated may occur to those skilled in the art and these can be made without departing from the spirit or scope of the invention as set forth.

We claim:

1. In a portable radiation measuring instrument wherein high accuracy and low power drain are desired, a G-M tube, voltage pulse source means for supplying relatively long energizing pulses to said tube, bi-stable switch means adapted to receive two input signals and having an output switched on with one signal and off with the other, meter means connected to the output of said switch means, means connected to said pulse source to apply timing signals to said switch means to turn it off, means connecting output signals from said G-M tube to said switch means to turn it on, and gating pulse means energized by said pulse source to permit said switch means to turn on only for a short precisely determined interval during each energizing pulse.

2. The instrument as in claim 1 wherein said timing signal means turns off, said switch means at each energizing pulse and subsequently holds it off for a brief instant, and immediately thereafter said gating pulse means enables said switch means to turn on.

3. The instrument as in claim 1 wherein the connection to said G-M tube is single-ended.

4. A highly efficient, very stable and accurate radiation measuring circuit comprising: a device to detect penetrating radiation and in response thereto to apply to an output terminal signal pulses whose rate of occurrence per unit of time is a measure of said radiation, voltage source means for supplying voltage to said device, a lengthy two conductor cable, one conductor of which is connected between said device and said source means and the other conductor of which is grounded, said cable having substantial inter-electrode capacitance and permitting said device to be positioned a considerable distance from the remainder of said circuit, pulse supply means for generating energizing pulses of relatively long duration, said pulses being added to the source means and applied to said device, a bi-stable coincidence circuit, means to couple signal pulses from said device into said circuit, means to couple energizing pulses into said circuit, meter means connected to said coincidence circuit, said coincidence circuit being adapted to apply energy to said meter means or not in accordance with the occurrence or non-occurrence of signal pulses along with energizing pulses applied to itself, and gating means energized by said pulse supply means to permit said coincidence circuit to turn on only during a short precisely timed interval following the beginning of each energizing pulse.

5. The circuit as in claim 4 wherein said means to couple signal pulses from said device comprises means responsive to the rate of decay of the voltage on said ungrounded cable conductor, whereby only when a signal is generated in said device is a momentary signal pulse obtained.

6. The circuit as in claim 4 wherein said means to couple energizing pulses to said circuit applies a timing pulse thereto which keeps said circuit off for an instant at the beginning of each energizing pulse whereby said meter is automatically turned off with each energizing pulse and switching transients are avoided.

7. The circuit as in claim 4 wherein said gating means is adjustable to change the range of said circuit.

8. The circuit as in claim 4 in further combination with means to disable said gating means to permit said coincidence circuit to detect signals from said device at any time.

9. The circuit as in claim 4 in further combination with an audible signal device including a sound transducer, an amplifier to drive said transducer, and means biasing said amplifier from said meter means and also connecting it to said pulse means, whereby when said meter means is energized above a given level, an audible buzzing will be heard from said transducer.

10. An improved radiation measuring circuit comprising: a G-M tube, voltage means to energize said tube with a pulse energizing voltage having a high value above the cutoff potential of said tube and a low value below said cutoff potential, a meter circuit to give a reading proportional to the rate of emission of signal pulses from said tube, and inhibit means to prevent actuation of said meter circuit for a short interval after the beginning of each energizing voltage pulse.

11. The measuring circuit in claim 10 in further combination with gating means permitting actuation of said meter circuit by signal pulses only during a short initial period of each energizing voltage pulse.

12. An improved radiation measuring circuit comprising a device for detecting radiation and in response thereto for emitting signal pulses, voltage supply means for periodically energizing said device with a gradually decaying energizing voltage pulse, a meter circuit to give a reading in response to signal pulses from said device, and means to prevent actuation of said meter circuit at the beginning of each energizing voltage pulse for a short instant, said meter circuit being responsive to a voltage decaying substantially faster than said energizing voltage pulse whereby a signal pulse can be detected in the presence of an energizing voltage pulse.

13. The circuit in claim 12 wherein said voltage supply means includes a voltage generator connected to said device by a de-coupling diode through the center conductor of a co-axial cable the outer conductor of which is grounded, said meter circuit being connected to said center conductor by a small capacitor.

14. An improved radiation measuring instrument comprising a device for detecting penetrating radiation and in response thereto for emitting signal pulses, voltage supply means for periodically energizing said device with energizing voltage pulses, a meter circuit to give a reading in response to signal pulses from said device, gating means to permit actuation of said meter circuit for a short interval only during each energizing voltage pulse, and means to disable said gating means to switch the range of said instrument, the repetition rate of said energizing pulses being adjustable whereby the scale form-factor of said meter circuit from one range to the other can be preserved.

15. An improved radiation measuring instrument comprising a device for detecting penetrating radiation and in response thereto for emitting signal pulses, voltage supply means for periodically energizing said device with relatively long duration voltage pulses, meter means responsive to said signal pulses for giving an indication of the radiation intensity, and gating means to permit actuation of said meter means for a short interval only during each energizing voltage pulse.

References Cited in the file of this patent

UNITED STATES PATENTS

| | | |
|---|---|---|
| 2,708,721 | Ziffer | May 17, 1955 |
| 2,752,508 | Zito | June 26, 1956 |
| 2,824,973 | Gundlach et al. | Feb. 25, 1958 |
| 2,838,680 | Bender et al. | June 10, 1958 |
| 2,963,588 | Wilson | Dec. 6, 1960 |
| 2,986,636 | Carlson et al. | May 30, 1961 |